C. L. CHISHOLM.
PHONOGRAPH ATTACHMENT.
APPLICATION FILED JULY 17, 1911.
1,204,341.
Patented Nov. 7, 1916.
3 SHEETS—SHEET 1.
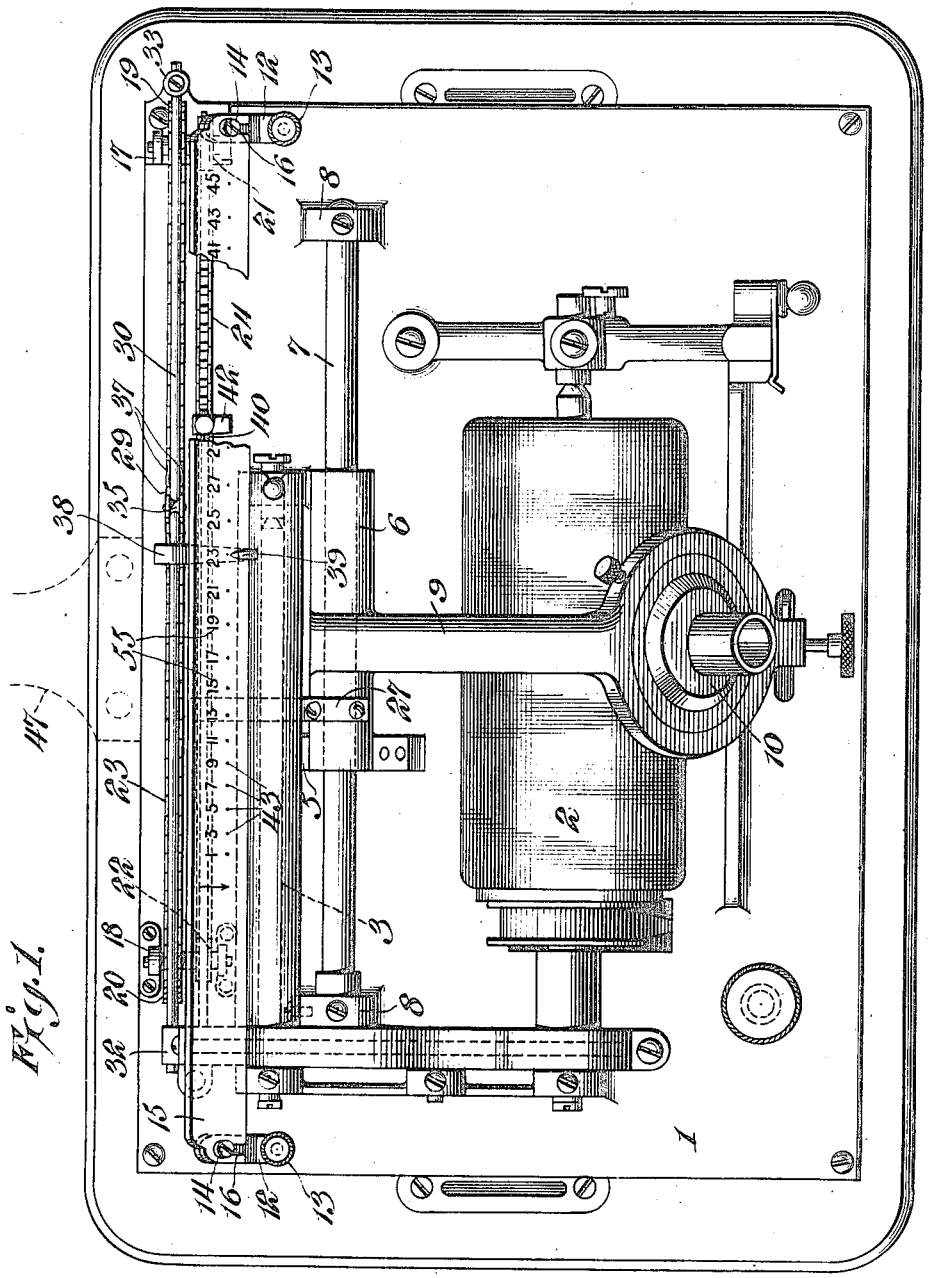
Charles L. Chisholm, Inventor,
Witnesses

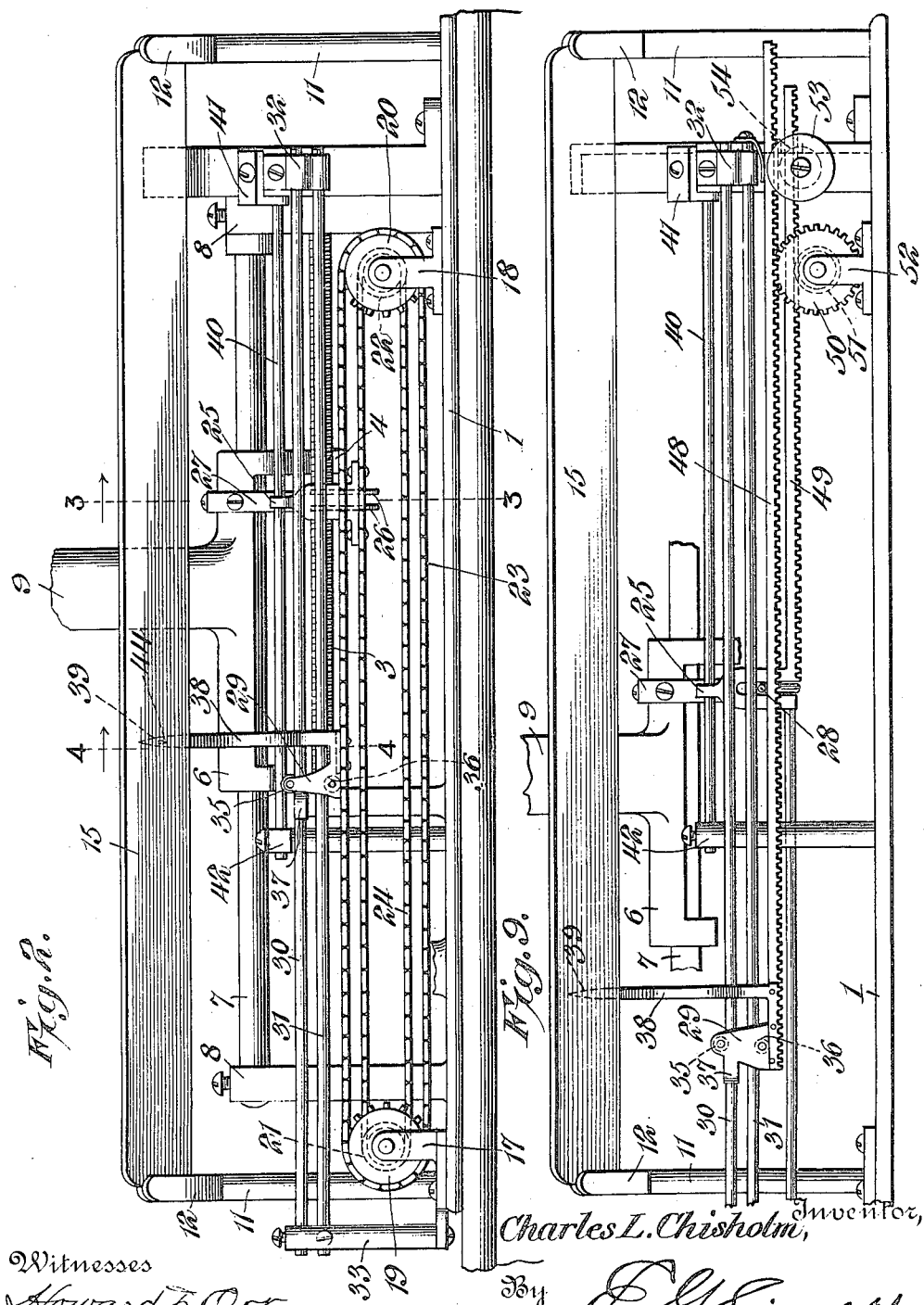

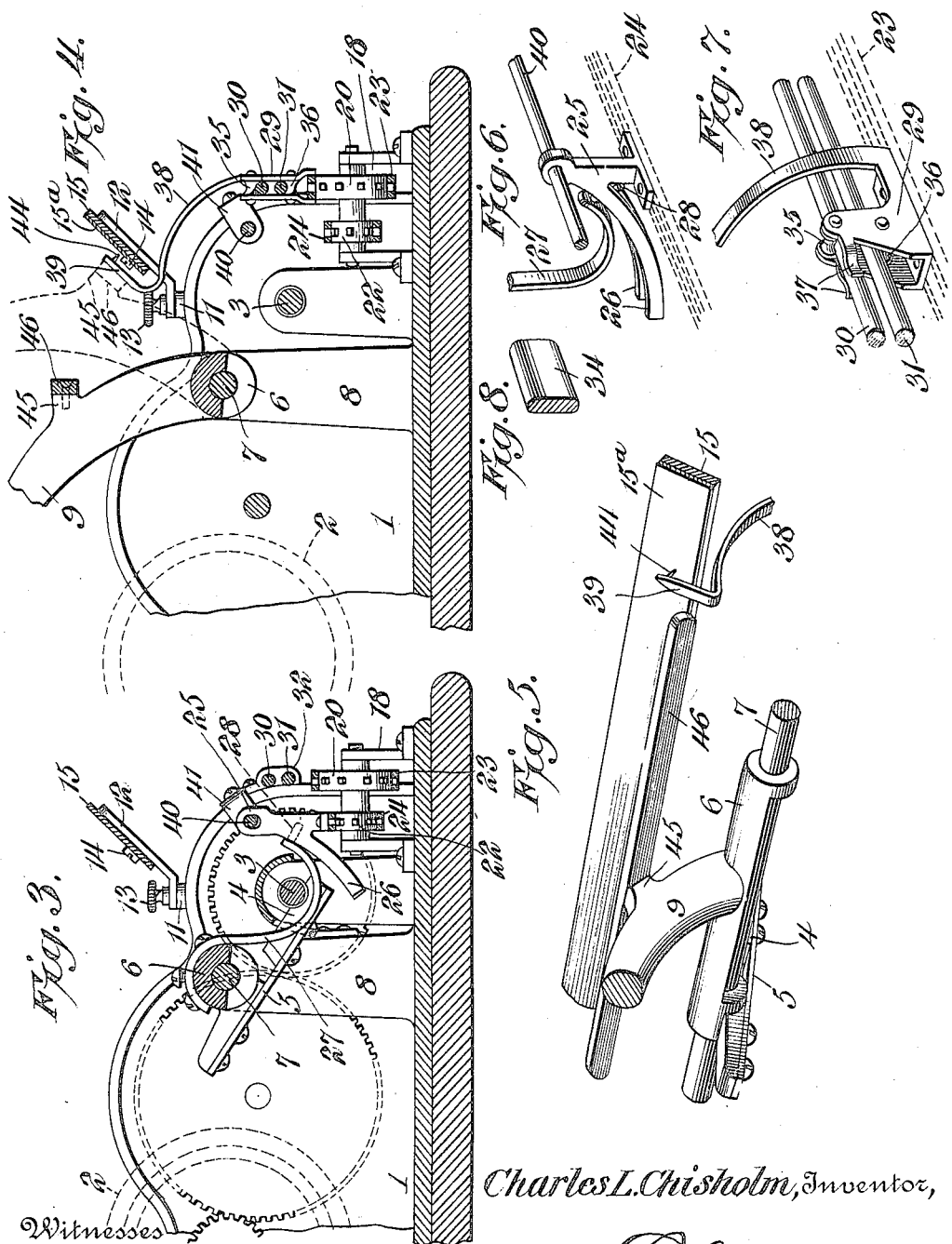

UNITED STATES PATENT OFFICE.

CHARLES L. CHISHOLM, OF MARYSVILLE, NEW BRUNSWICK, CANADA, ASSIGNOR OF ONE-FOURTH TO EDWARD G. SIGGERS, OF WASHINGTON, DISTRICT OF COLUMBIA.

PHONOGRAPH ATTACHMENT.

1,204,341.                Specification of Letters Patent.         Patented Nov. 7, 1916.

Application filed July 17, 1911. Serial No. 638,977.

*To all whom it may concern:*

Be it known that I, CHARLES L. CHISHOLM, a subject of the King of Great Britain, residing at Marysville, in the county of York, New Brunswick, Canada, have invented a new and useful Phonograph Attachment, of which the following is a specification.

This invention has reference to improvements in means for the teaching of music, whether vocal or instrumental, and its object is to provide an indicating means attachable to a sound reproducing machine, whereby the teaching of large classes of students, whether in public schools or elsewhere is greatly facilitated.

In accordance with the present invention great skill on the part of the teacher in demonstrating the music is not required, since with the present methods of sound recording it is possible to provide records of either vocal or instrumental music as produced by the best artists with the highest degree of perfection as to rhythm, phrasing, expression, absolute pitch, intonation, etc., so that all the difficulties of these various characteristics of the music may be instilled into the students or pupils infinitely better and quicker than by the ordinary methods of teaching where the pupils must depend for their example upon the individual teacher, who either from lack of training or overwork is unable to accurately impart to the pupils the various characteristics of the music.

The teaching of large classes should be adapted to the progress of the pupils of less acute conception of the music, and it becomes necessary to repeat, in some instances many times, certain portions of the music before all the pupils capable have properly grasped the correct characteristics of the music as exemplified by the sound record. The present invention contemplates means whereby the teacher may repeat any particular part of the record at will as many times as desired without the necessity of reproducing more than the particular part wanted, and in order that this may be done, the means for enabling the teacher to set the instrument to the desired point must be of the grosser type in order that a setting of the machine may be done quickly and no time need be lost either by the difficulty of finding the point where the reproduction should begin or end and without the liability of reproducing more of the selection than is necessary for the purpose.

The present invention is designed to be used in conjunction with a chart or charts giving the musical notation, and such information as may be useful in connection with the sound record, so that the pupil is trained both by eye and ear, and by hearing correct reproductions of the music becomes trained in the proper interpretation and rendition of the music, the sound reproducing machine being capable of giving practically infallible examples for the guidance of the pupil.

The present invention contemplates a structure which may be attached to a sound reproducing machine, and which is so arranged that indicating members are caused to have a magnified range of travel by the progressive movement of the sound record where the tablet moves both rotatively and progressively, or the tone arm where the latter travels progressively over the sound record, whereby the teacher may readily set the reproducer of the machine to the desired point for repetition of a portion of the sound record without liability of overlapping or failing to include the beginning of the part to be repeated. Moreover, the invention contemplates means whereby the teacher may mark the chart for musical characteristics, say, for instance, for phrasing, and may then produce an index individual to the sound record which will agree with the musical notation of the chart.

The invention will be best understood from a consideration of the following detailed description, taken in connection with the accompanying drawings forming a part of this specification, with the understanding, however, that while the drawings show practical embodiments of the invention as applied to a known type of sound reproducing machine, the invention is susceptible of other practical embodiments and may be changed and modified in structure to adapt it to other types of sound reproducing machines without departure from the salient features of the invention.

In the drawings,—Figure 1 is a plan view of a sound reproducing machine with the invention applied. Fig. 2 is a rear elevation, with some distant parts broken away, of the structure shown in Fig. 1. Fig. 3 is a section on the line 3—3 of Fig. 2. Fig. 4 is a section on the line 4—4 of Fig. 2, but modified by the inclusion of an additional element. Fig. 5 is a perspective view of a portion of the structure of Figs. 1 and 2 and including the additional element indicated in Fig. 4. Fig. 6 is a perspective view taken from the rear of the connection between the indicating structure of the present invention and the feed nut of the sound reproducing machine. Fig. 7 is a perspective view taken from the rear of the machine of a portion of the indicating mechanism. Fig. 8 is a detail perspective view of a modified form of a portion of the attachment. Fig. 9 is a view similar to Fig. 2 but showing a somewhat modified form of the structure.

Referring to the drawings there is shown a sound reproducing machine 1 which, being of known type, requires no special description as to its mechanism, and only such parts will be referred to specifically as have to do with the parts coöperating with the sound reproducing machine for the purposes of the present invention. The particular type of sound reproducing machine shown is that known in the trade as the Edison phonograph and is, therefore, capable of sound recording as well as sound reproduction. It is to be noted that the invention is, of course, not limited to an Edison phonograph, but is readily adaptable to the machine known as the graphophone or the machine known as the gramophone, or the Victor talking machine. In fact, the invention is not limited to any particular type of sound reproducing machine, and the sound reproducing machine shown in the drawings is, therefore, to be taken as simply typical of any sound reproducing machine, whether such machine be capable of recording sound or not. In the drawings, the machine is shown as provided with a sound record 2, which is illustrated as of the cylindrical type, but may be taken as also typical of the disk type of sound record when the invention is adapted to the disk type of sound reproducing machine.

In the particular type of sound reproducing machine shown in the drawings, there is provided a feed screw 3 to which may be applied the usual half-nut 4, the latter being connected by an arm 5 to a sleeve 6 mounted on a rod 7 secured at the ends in posts 8 rising from the supporting plate of the working parts of the machine. The sleeve 6 has formed thereon or fast thereto an arm 9 carrying at the end remote from the sleeve a sound box 10 adapted to engage the sound record groove of the record tablet 2, after the usual manner, to reproduce the sound recorded on such tablet, and customarily the reproduced sound is amplified by a suitable horn, which latter, however, is not shown in the drawings. The sleeve 6 and arm 9, therefore, constitute a carrier or carriage for the sound box and its stylus. In the particular machine illustrated in the drawings as the sound box is brought into reproducing relation to the sound record the half-nut 4 is brought into engagement with the feed screw 3, and when the sound box is moved away from the record about an axis defined by the rod 7, the half nut 4 is at the same time moved away from the feed screw 3 and the sound box may be then freely moved lengthwise of the rod 7, which is parallel with the feed screw 3 and with the longitudinal axis of the sound record groove when the sound record 2 is mounted on a machine. Consequently the sound box may be moved to any point desired, this being an arrangement common to all types of sound reproducing machines.

In the structure shown in the drawing there are erected on the supporting plate of the machine near opposite ends thereof posts 11, these posts being near the rear of the machine, considering the part of the machine carrying the sound record as the front of the machine. Each post 11 has secured to it at the upper end an angle strip 12 secured to the post by a thumb screw 13 and the angle of the strip 12 is such that the greater portion of the strip is at an angle about midway between the vertical and horizontal considering the sound reproducing machine as a whole as resting upon a level support. The longer portion of each strip 12 has on the forward face a headed pin or stud 14 which for convenience may be in the form of a fillister head screw. The angle strips 12 are designed to receive the ends of an index strip or plate 15, the ends of this plate where engaging the strip 12 being provided with entering recesses 16 each of a size to receive the shank of the corresponding screw 14 but too narrow to permit the head of the screw to pass, so that the index plate 15 is readily secured to the angle strips 12 but may be quickly removed when desired. The fit of the parts is readily adjusted so that the index plate may be placed on a machine or removed at will, but will be retained by the pins 14 with sufficient frictional engagement to avoid accidental displacement of the index strip under ordinary conditions of use. The index strip 15 may be additional to the ordinary index of the machine, so as not to interfere with the use of the machine for other purposes than the purpose of the present invention. The index strip is provided with suitable markings to which reference will hereinafter be made. The posts 11 are placed comparatively close to the ends of the base plate of the machine and the strip 15 is made correspondingly long, being in the particular construction shown more than twice as long as the record space upon the record cylinder 2.

In the structure shown in Figs. 1, 2, 3 and 4 the base plate carries ear blocks 17, 18, respectively, in which are mounted sprocket wheels 19, 20, respectively. The sprocket wheel 19 has fast thereto a smaller sprocket wheel 21 and the sprocket wheel 20 has fast thereto a smaller sprocket wheel 22. The sprocket wheels 19 and 20 are of like size and the sprocket wheels 21 and 22 are of like size, but in the particular structure shown are of smaller size than the sprocket wheels 19, 20 and a working relation wherein the sprocket wheels 19 and 20 are twice the size of the sprocket wheels 21 and 22 has been found to give a satisfactory result. The ear blocks 17 and 18 are spaced apart an appropriate distance which is greater in the particular structure shown than twice the length of the available record surface of the tablet or record cylinder 2. Applied to the sprocket wheels 19 and 20 is an endless sprocket chain 23 and applied to the sprocket wheels 21 and 22 is another endless sprocket chain 24.

The sprocket chain 24 carries a bracket 25 having outstanding from one side two parallel curved fingers 26 having their terminal ends presented toward the front of the machine and appropriately curved. Fast to the sleeve 6 is an arm 27 so curved as to extend under the screw 3 and at the rear end upwardly bent and terminating in a pin 28 adapted to enter the space between the fingers 26. The curvature of the fingers 26 is such as to be concentric to the longitudinal axis of the rod 7, so that when the sound box is lifted from or returned to the sound record, the pin 28 will travel along between the fingers 26 without disengaging therefrom. The arm 27 with its finger 28 is designed to serve as a propelling means for the bracket 26 and chain 24, and as the chain 24 engages the two pinions 21 and 22 any movement of the chain in the direction of its length must result in the rotative movement of the two sprocket wheels or pinions 21 and 22, and since these sprocket wheels or pinions are fast to the other sprocket wheels 19 and 20 the rotative movement of the sprocket wheels 21 and 22 is participated in by the sprocket wheels 19 and 20 and the chain 23 is caused to travel in the direction of its length. Since the sprocket wheels 19 and 20 are in the particular instance shown twice the diameter of the sprocket wheels 21 and 22, the chain 23 will travel with twice the linear speed of the chain 24. Fast to the chain 23 is a yoke bracket 29 straddling two parallel rods 30, 31, these two rods being made fast at one end in a block 32 secured at an appropriate point to a fixed part of the machine and at the other end in a post 33 which may be secured on the eye block 17 and rising therefrom. It is evident that the two rods 30 and 31 may be replaced by any other appropriate structure, as, for instance, by a single bar 34 shown separately in Fig. 8. The yoke bracket 29 carries spaced rollers 35, 36 adapted to respectively engage the rods 30 and 31, whereby the bracket 26 is guided by these rods and because the rods are spaced apart the bracket is held in a comparatively rigid position although free to move longitudinally of the rods. The same fixity of position with the same freedom of longitudinal movement is provided by the single rod 34 and there are numerous other mechanical expedients for accomplishing a like purpose. The yoke bracket 29 is provided with opposite spring fingers 37, adapted to grasp the guide rod or rods, operating as an elastic brake, whereby the yoke bracket 29 while sufficiently free to move lengthwise of the guide rod or rods is held at any position to which it may be moved by the fingers 37 against accidental displacement except by a superior force such as is provided by the feed screw of the sound reproducing machine. The bracket 29 has formed thereon or secured thereto a pointer arm 38 appropriately bent and of sufficient length to extend toward the bracket 29 in first a forward direction until in front of the index plate 15 and then in an upward and backward direction until in overriding relation to the front of the plate 15. This index arm 38 is formed at the free end with a finger 39 in operative relation to the face of the index plate 15 when the latter is in place.

When the machine is in operation reproducing sound recorded upon the sound tablet 2, the sound box is propelled in the usual manner by the feed screw 3 engaging the half-nut 4. This progressive movement of the sound box is imparted to the arm 27 and by the latter through the pin 28 to the bracket 25 and the said bracket in turn drives the chain 24, the bracket 25 being suspended from a guide rod 40 appropriately mounted at one end in a block 41 fast to a fixed part of the machine, and at the other end on a post 42 erected at an appropriate point on the base plate of the machine. The progressive movement of the chain 24 imparts a more rapid movement to the chain 23 in the same direction and consequently the pointer 31 of the index arm or finger 38 will travel over the index plate 15 with a speed as much greater than the speed of travel of the sound box over the record as the relation between the sprocket wheels carrying the two chains.

In order to adapt the index 15 to the magnified speed of the index finger 39, there is produced upon the index plate 15 or upon an index strip 15ᵃ lodged on a strip 15 a series of index points in the shape of dots or indents 43 spaced apart in conformity with the increased travel of the index pointer 39 over the travel of the sound box with relation to the sound record on the tablet 2.

Suppose a teacher desires to prepare the chart of musical notation for some recurrent characteristic of the music, as, for instance, phrasing. The teacher notes on the music the recurrent phrases, as, for instance, by a set of progressive numerals. Then the music already recorded upon the cylinder 2 is reproduced and, of course, the index finger 38 with its point 39 will travel over the strip 15. Such strip is usually made of metal and in order that it may have a comparatively soft impression surface there may be applied thereto a supplemental strip 15ᵃ made of cardboard, paper or other impressionable material, while the end 39 of the finger 38 is provided with a pointed pin 44 substantially perpendicular to the plane of the outer surface of the strip 15ᵃ. The teacher may listen to the music as reproduced by the machine, and at the beginning of each phrase or desired passage may push the pin 44 toward the strip 15ᵃ to cause the point of the pin to make an impression in such strip and the movement may be sufficiently rapid to make it unnecessary to stop the machine. When the pointer arm or finger 38 is provided with an impression making pin 44, the end 39 carrying the pin 44 may be made sufficiently elastic to bend without a corresponding bending of the main portion of the finger 38.

It is sometimes advisable to cause the impression by the pin 44 when the sound box is not being impelled by the record, but without causing the driving mechanism of the machine to stop. For this purpose the arm 9 carrying the sound box is formed at an appropriate point with a stud 45 to which is made fast a bar 46 extending laterally to each side of the arm 9, the said bar 46 being parallel to the rod 7 and plate 15 with its impression surface 15ᵃ. The bar 46 is of such length and so related to the arm 9 that some portion of the bar will always be in position to engage the end 39 of the finger 38 when the sound box is elevated from operative relation to the sound record and is swung away from the same about the bar 7 as a pivot support, and when the arm 9 is swung sufficiently to the rear the bar 46 is caused to engage the end 39 of the finger 38 and force the pin 44 into the receiving strip 15ᵃ, thereby making an impression therein, while the sound box and its carrying arm 9 is not moving progressively. When the sound box is returned to its first position, that is, into engagement with the record groove, the reproduction of the sound at once starts where it was interrupted by the lifting of the sound box from the sound record, and this operation may be repeated at proper intervals until there are produced upon the record receiving surface 15ᵃ all the indications of the particular characteristic desired by the teacher embraced within the recorded music, and likewise marked upon the chart. In order to support a music chart upon the machine, especially where such chart is of small size, the machine may be provided with a holder 47 indicated in dotted lines in Fig. 1. Where the chart is of large size and designed to be supported upon an easel or upon a wall the music holder may be omitted. Whether the large chart or the small size charts be used in connection with a machine, small charts may be provided for the pupils individually.

In Fig. 9 a somewhat different mechanism for producing the magnified movement of the index finger is shown. The two chains 23 and 24 are replaced by racks 48 and 49, respectively, the rack 48 being made fast to the bracket 29 carrying the finger 38 and the rack 49 being made fast to the bracket 25 impelled by the arm 27. The two racks engage respective gear wheels 50 and 51 connected together and mounted in an ear block 52 carried by the base plate of the machine. The racks are also provided with supporting rollers 53, 54 journaled on a fixed portion of the machine. The action of the structure shown in Fig. 9 is the same as the structure shown in Figs. 1 and 2, except that the free ends of the racks will in one position extend beyond the margins of the machine, but otherwise the structure is in effect no different from the structure of Figs. 1 and 2.

In any system of teaching a teacher should impart to the pupils very thoroughly the theory upon which the music is based, and then impress this theory upon the minds of the pupils by the practical demonstration afforded by the operation of the sound reproducing machine, the conditions rendering it possible to produce the audible examples with absolute accuracy as to pitch, time and phrasing. By varying the speed of the sound reproducing machine within suitable limits the same record may be reproduced in different keys. With the present invention a teacher may without loss of time or stopping the machine select any passage or phrase of the record and repeat the same to a class until the most delicate shades of interpretation are thoroughly impressed upon the minds of the hearers. This is facilitated by associating with the indications 43 numerals 55 or other indicia which may be likewise indicated either upon a key chart in the hands of the teacher or upon the machine or upon the wall chart or the hand charts possessed by the pupils, the teacher readily selecting the passage to be repeated and by moving the sound box until the index end 39 of the finger 38 agrees with the proper indication 43, the sound box may be moved into engagement with the record with the assurance because of the magnified travel of the index finger that the machine will at once begin to reproduce the desired phrase or passage beginning at the proper note without liability of reproducing several undesirable notes or beginning late in the passage to be reproduced.

Where duplicate records are made, a single master index may be prepared in the manner set forth by impressing indications upon an impressionable strip 15ª and from this latter strip index plates 15 of a more permanent character may be produced and accompany the duplicate records, and in very exceptional cases different index strips for different characteristics may also be provided for the same record. However, the one index from the master index will usually suffice for the most exacting requirements.

While straight index strips and two means for magnifying the travel of the index pointer over them have been shown, this does not preclude the use of other shaped indexes or other means for magnifying the travel of the pointer with reference to the progressive travel of the sound record or other impelling means.

Sound record tablets even when made from a single master record will sometimes vary in length or point of beginning so that it becomes necessary to adjust the index member to the particular sound record, and this is provided for by the angle strips 12 and thumb or set screws 13. Moreover, the beginning of the index may be indicated by a distinctive mark as by the arrow shown on the index plate 15 in Fig. 1, adjacent the left hand or beginning of the index markings.

What is claimed is:—

1. An attachment for sound reproducing machines comprising an index finger or pointer, and means responsive to the progressive movement of the sound reproducing elements of the sound reproducing machine for causing a greater linear movement of the index or pointer than the linear movement of the sound reproducing elements with relation to the sound record.

2. In a sound reproducing machine, sound reproducing elements movable progressively with relation to a sound record, and indicating means for the progress of the sound reproducing elements with relation to the sound record, said indicating means including an index or pointer, and speed magnifying connections between those parts of the sound reproducing mechanism movable with relation to the record and the index or pointer.

3. In a sound reproducing machine having sound reproducing devices, movable progressively with relation to a sound record tablet on the machine, an index member of greater length than the extent of travel of the sound reproducing devices with reference to the record, an index or pointer movable along the index member, and speed multiplying connections between the sound reproducing devices and said index or pointer.

4. In a talking machine provided with a sound box and carrier therefor, and also with a support for a sound record, an index member having indicia thereon, an index or pointer movable with relation to said index member, and connections between said index or pointer and the sound box carrier movable progressively with relation to a sound record mounted on the machine, said connections including means for imparting to the index or pointer a greater range of movement than the movement of the sound box carrier.

5. In a talking machine provided with a sound box and carrier therefor, and also with a support for a sound record, an elongated index member, an index or pointer mounted for linear movement along and with respect to said index member, and attachments for connecting the index member to the sound box carrier of the machine, said attachments being movable progressively with relation to a sound record when mounted on the machine for impelling the index or pointer, and including coactive rotating members of different diameters and linearly movable members individual to the different coactive rotating members, one of said linearly movable members being connected to the index or pointer and the other to the sound box carrier.

6. In a talking machine provided with a sound box and carrier therefor and also with a support for a sound record, an elongated index member, an index or pointer mounted for linear movement along and with respect to said index member, and attachments for connecting the index member to parts of the machine movable progressively with relation to a sound record when mounted on the machine to thereby impel the index or pointer, said attachments comprising connected sprocket wheels of different diameters, sprocket chains engaged by said sprocket wheels, a device on one sprocket chain carrying the index or pointer, and a device on the other sprocket chain adapted for connection to the said movable part of the machine.

7. In a sound reproducing machine provided with sound reproducing devices movable progressively with relation to a sound record mounted on the machine and also capable of movement to and from the sound record, an elongated index member, an index or pointer mounted for movement along said index member in operative relation thereto, and relatively movable connections between the index or pointer and movable sound reproducing devices for maintaining operative relation between said index or pointer and the sound reproducing devices irrespective of the movement of the sound reproducing devices to and from the sound record.

8. In a talking machine, the combination of a tablet support, a sound box and carriage therefor, and means imparting movement to said carriage and sound box past said tablet support, with an impression device comprising an impression receiving surface and means for making an impression thereon, one member of said impression device being movable past the other, and means whereby the movement of the carriage imparts movement to the movable member of the impression device, the impression making means being provided with an index or pointer whereby said means serves to both make the impression and indicate the location of the same after it is made.

9. In a sound reproducing machine, means for supporting an elongated index member having an impression receiving surface, an index or pointer and means whereby the index or pointer is caused to respond to progressional movement of the movable sound reproducing devices of the machine, said index or pointer being provided with an impression producing point movable into engaging relation with the impression receiving surface of the index member mounted on the machine.

10. In a sound reproducing machine having sound reproducing members movable progressively with relation to a sound record mounted on said machine, means for the support of an index member, an index or pointer movable over an index member when mounted on the machine and provided with a marking member adapted to then engage the index member, and means carried by the movable sound reproducing devices and movable by said devices into engagement with the index or pointer to cause the marking member of the latter to actively engage an index member when mounted on said machine.

11. In a sound reproducing machine having sound reproducing devices movable progressively with relation to a sound record mounted on the machine, a support on the machine for an elongated index member, an index or pointer provided with connections with the said movable sound reproducing devices, and also provided with a marking member movable into engagement with the index member when on the support, and a bar on the movable sound reproducing devices movable by the latter into engagement with the index or pointer to actuate said index or pointer to carry the marking device thereof into engagement with the index member when on the support.

12. In a sound reproducing machine having sound reproducing devices movable progressively with relation to a sound record mounted on said machine, a support for an elongated index member, a pointer movable linearly with relation to the elongated index member when on the support, means for imparting to the index member a greater extent of travel than the progressive movement of the sound reproducing devices, said index member being also provided with a marking member movable into engagement with the index member when mounted on the machine, and an elongated bar carried by the sound reproducing devices and movable by the latter into engagement with the index or pointer to move the marking device thereof into engagement with the index member when mounted on the machine.

13. In a sound reproducing machine, an index member having indicia representing characteristics of a musical composition and a distinctive mark indicating the beginning of the composition recorded, an index pointer movable over the index member where in place in response to the travel of the sound reproducer of the machine with relation to the sound record, and a support for the index member having means for the adjustment of said index member to conform with variations in different sound records, said means comprising pivoted strips and readily manipulated clamping means for holding the strips in adjusted positions.

14. In a talking machine the combination of a revoluble tablet support, a sound box and carriage therefor, and means imparting movement to said carriage and sound box past said tablet support, with an impression device comprising an impression receiving surface and means for making an impression thereon, one member of said impression device being movable past the other, and means whereby the movement of said carriage imparts movement to the movable member of said impression device past the relatively stationary member of said device.

15. The combination of a talking machine comprising a revoluble tablet support, a movable carriage for the stylus, a stationary impression receiving surface, and means moved by the carriage along said surface in operative juxtaposition thereto and ready at all times for making an impression thereon.

In testimony that I claim the foregoing as my own, I have hereunto affixed my signature in the presence of two witnesses.

CHARLES L. CHISHOLM.

Witnesses:
J. C. ANDERSON,
W. H. IRVINE.